3,301,068
DEVICE FOR FACILITATING THE INSPECTION OF TABLETS
Gunnar Baalsrud, Slependen, Norway, assignor to Collett & Co. A/S, Oslo, Norway
Filed Dec. 23, 1963, Ser. No. 332,595
Claims priority, application Norway, Jan. 7, 1963, 147,039
2 Claims. (Cl. 73—432)

The invention concerns a device whereby tablets can be inspected on both sides, and where this can be done by one operator.

A known method is to inspect tablets on each side by putting the tablet on a conveyor, where it is inspected on one side by an operator, whereafter the tablet is turned and transported on another conveyor, where another operator will inspect the other side of the tablet.

There are other known arrangements, where the tablet is placed on a conveyor to be inspected by an operator, whereafter the tablet is turned and returned on another conveyor parallel to the first conveyor, but as a rule in a different plane and in opposite direction of motion, after which the other side of the tablet is inspected by the same operator.

For the first procedure two operators are needed, while the other procedure demands that the operator has got to keep an eye on both conveyors.

The purpose of this invention is therefore to provide a device, which in a very simple way makes it possible to inspect the tablet on both sides from the same inspection place, with the operation being performed by only one operator.

The above object is attained by depositing single tablets with one side facing uppermost on the upper surface of a rotating disk with the tablets arranged in a circular concentric path whereby the uppermost surface of the tablet may be inspected as the same moves past an inspection station. Thereafter, the tablet is turned over and moved into a circular concentric path of either smaller or larger diameter than the first path and moved past the inspection station for inspection of the opposite side face of the tablet.

Further objects and advantages of the invention will be apparent from the following description taken in conjunction with the accompanying drawings wherein.

Figure 1:
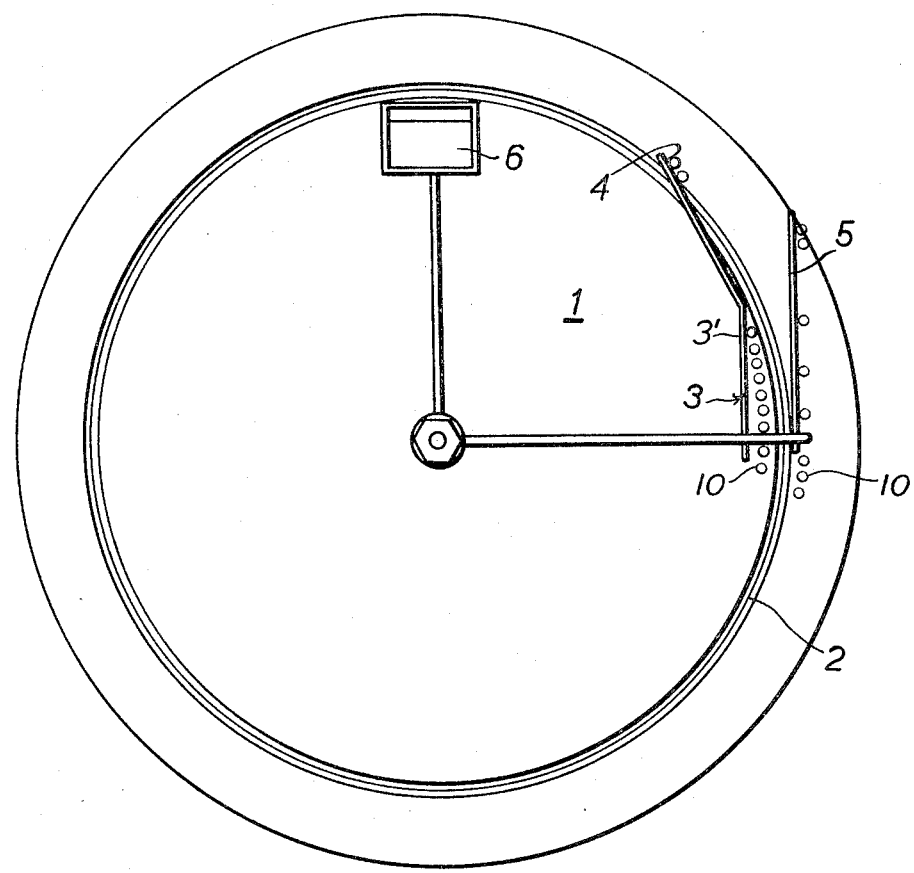
FIG. 1 is a plan view of a device constructed in accordance with this invention.
Figure 2:
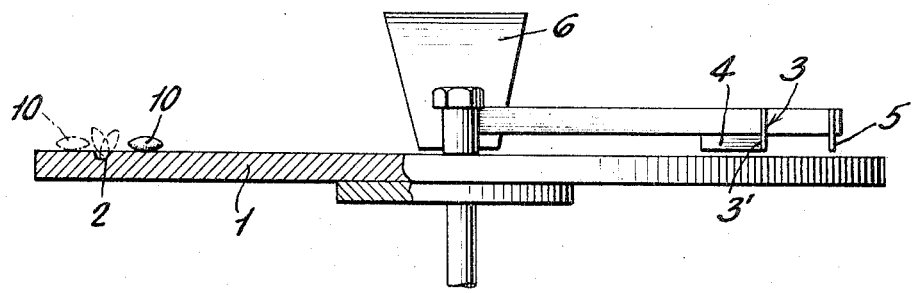
FIG. 2 is an elevational view of the device shown in FIG. 1 with parts in section for greater clarity and showing the different positions occupied by the tablet during the inspection procedure.

With continued reference to the drawing, there is shown a device for facilitating the inspection of tablets constructed in accordance with this invention, which device comprises a rotating horizontal disk 1 having a concentric groove 2 in the upper surface of a depth and width less than the tablet diameter and two guide members 3 and 5 disposed above the upper surface of the table 1 a distance less than the thickness of the tablet to be inspected. As shown in FIG. 1, the guide member 3 may consist of a straight portion 3' and a second straight portion 4 disposed at an angle to the first straight portion 3'. The disposition and operation of this guide member will be later described. The second guide member 5 may be in the form of a straight bar or rail and the disposition and operation of this guide member will likewise be later described.

Figure 3:
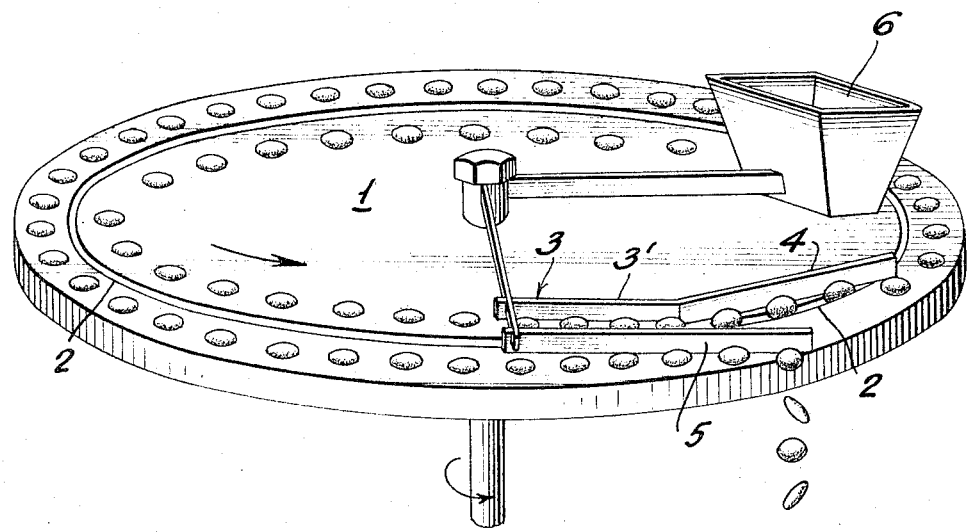
FIG. 3 is a perspective view further illustrating the invention.

The tablets 10 to be inspected are fed successively one after the other from a suitable hopper 6 and are deposited on the upper surface of the disk 1 in a circular concentric path parallel to and adjacent the groove 2 in the rotating disk 1. This groove 2 has a V or U-shape in cross section (see FIGURE 3) and is adapted to receive the lower edge of the tablet 10 in such a manner that the bottom of the groove 2 will provide a point of support for the edge of the tablet when the tablet slides or falls into the groove 2 as a result of engagement with the straight portion 3' of the guide member 3 which, as shown in FIG. 1, is disposed at an angle to the groove 2. Upon further rotation of the disk 1, the straight portion 4 of the guide member 3 which extends across the groove 2 at an angle thereto engages the upper part of the tablet projecting out of the groove 2 and moves the same transversely of the groove 2 in a generally radial direction with the groove bottom serving as a turning point until the tablet is moved out of the groove 2 and deposited on the upper surface of the disk 1 with the opposite side face of the tablet uppermost. In this position, the tablets 10 are disposed in a concentric circular path outwardly of the groove 2 and travel with the disk 1 in this path for inspection of the opposite surface of the tablets. After moving through the second circular concentric path, preferably for one revolution of the disk 1, the tablets 10 successively engage the second guide member 5 which is disposed at an angle to the second circular path and this engagement with the second guide member 5 will result in moving the tablets outwardly of the second circular path and to the edge of the disk 1 where the tablets may be discharged into a suitable container.

It will be seen that by the above described invention there has been provided a relatively simple, yet highly effective device for facilitating the inspection of both side faces of a tablet by a single operator and at a single inspection station and with the tablets disposed in the same plane at a position convenient for visual inspection by the operator.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:
1. A device for facilitating the inspection of tablets, said device comprising a circular rotatably mounted horizontal disk, said disk having a concentric groove in the upper surface of a depth and width less than the tablet diameter, means disposed above said disk for depositing single tablets with one side face uppermost on the upper surface of said disk in a circular concentric path parallel to and adjacent said groove, a stationary guide member disposed above said disk a distance less than the thickness of the tablet, said guide member extending across said circular path and said grove at an angle thereto, whereby upon rotation of said disk to move said tablets in said circular path, said tablets will successively engage said guide member and be moved in a generally radial direction to deposit said tablets on edge in said groove, and will thereafter be moved out of said groove and deposited on the upper surface of said disk with the opposite side face uppermost and in the second circular concentric path on the opposite side of said groove from said first path, and a second stationary guide member disposed above said disk a distance less than the thickness of the tablet, said second guide member extending across only said second circular path at an angle thereto, whereby upon suc- cessive engagement of the tablets in said second path with said second guide member said last named tablets will be moved in a generally radial direction out of said second path to a point of discharge from said disk.

2. A device for facilitating the inspection of tablets as defined in claim 1 in which said first guide member is bent to provide a straight portion disposed at an angle to said first circular path, and a second straight portion disposed at a different angle to said groove, and in which said second guide member is straight.

References Cited by the Examiner
UNITED STATES PATENTS

| | | | |
|---|---|---|---|
| 330,951 | 11/1885 | Wilkins et al. | 221—167 |
| 2,065,319 | 12/1936 | Lewis | 222—408 X |
| 2,839,252 | 6/1958 | Hall | 107—17 X |
| 2,888,169 | 5/1959 | Hausman et al. | 221—167 |

RICHARD C. QUEISSER, *Primary Examiner.*

J. W. MYRACLE, *Assistant Examiner.*